United States Patent
Bignon et al.

(10) Patent No.: US 9,536,077 B2
(45) Date of Patent: Jan. 3, 2017

(54) METHOD FOR DETECTING ATTACKS AND FOR PROTECTION

(75) Inventors: Fabien Bignon, Caen (FR); Sylvie Laniepce, Caen (FR); Karel Mittig, Caen (FR)

(73) Assignee: ORANGE, Paris (FR)

( * ) Notice: Subject to any disclaimer, the term of this patent is extended or adjusted under 35 U.S.C. 154(b) by 11 days.

(21) Appl. No.: 14/129,004

(22) PCT Filed: Jun. 21, 2012

(86) PCT No.: PCT/FR2012/051425
§ 371 (c)(1),
(2), (4) Date: Apr. 7, 2014

(87) PCT Pub. No.: WO2012/175886
PCT Pub. Date: Dec. 27, 2012

(65) Prior Publication Data
US 2014/0223556 A1    Aug. 7, 2014

(30) Foreign Application Priority Data

Jun. 24, 2011  (FR) ...................................... 11 55617

(51) Int. Cl.
| | | |
|---|---|---|
| G06F 21/50 | (2013.01) | |
| H04L 29/06 | (2006.01) | |
| G06F 21/55 | (2013.01) | |
| G06F 9/455 | (2006.01) | |

(52) U.S. Cl.
CPC ........... *G06F 21/50* (2013.01); *G06F 9/45558* (2013.01); *G06F 21/554* (2013.01); *H04L 63/1441* (2013.01); *G06F 2009/4557* (2013.01); *G06F 2009/45587* (2013.01)

(58) Field of Classification Search
CPC ............... G06F 2009/4557; G06F 2009/45587
See application file for complete search history.

(56) References Cited

U.S. PATENT DOCUMENTS

| | | | |
|---|---|---|---|
| 8,353,031 B1 * | 1/2013 | Rajan et al. .................... | 726/22 |
| 8,479,294 B1 * | 7/2013 | Li et al. ........................... | 726/24 |
| 8,495,741 B1 * | 7/2013 | Naftel et al. .................... | 726/24 |
| 2008/0134177 A1 * | 6/2008 | Fitzgerald et al. .............. | 718/1 |

(Continued)

FOREIGN PATENT DOCUMENTS

JP        2010073011 A  *  4/2010

OTHER PUBLICATIONS

Manual Translation of JP Patent Application Publication 2010/073011.*

(Continued)

*Primary Examiner* — Farid Homayounmehr
*Assistant Examiner* — Zhimei Zhu
(74) *Attorney, Agent, or Firm* — David D. Brush; Westman, Champlin & Koehler, P.A.

(57) ABSTRACT

A method is provided for attack detection and protection of a set of virtual machines in a system, which includes at least one first host server hosting said set of virtual machines. The method includes: receiving an attack detection message regarding a virtual machine, triggering a first migration of the virtual machine from the first host server toward a security system, and receiving an attack treatment message regarding the migrated virtual machine.

9 Claims, 3 Drawing Sheets

(56) References Cited

U.S. PATENT DOCUMENTS

| | | |
|---|---|---|
| 2008/0235769 A1 | 9/2008 | Purcell et al. |
| 2009/0222558 A1* | 9/2009 | Xu et al. ................. 709/224 |
| 2009/0307769 A1* | 12/2009 | Curnyn ..................... 726/22 |
| 2010/0115512 A1* | 5/2010 | Sakai ........................ 718/1 |
| 2011/0004935 A1* | 1/2011 | Moffie et al. ............. 726/23 |
| 2011/0016467 A1* | 1/2011 | Kane ......................... 718/1 |
| 2011/0023114 A1 | 1/2011 | Diab et al. |
| 2011/0035802 A1* | 2/2011 | Arajujo et al. ............ 726/23 |
| 2011/0078797 A1 | 3/2011 | Beachem et al. |
| 2011/0258701 A1* | 10/2011 | Cruz et al. ................ 726/23 |
| 2013/0024940 A1* | 1/2013 | Hutchins et al. ......... 726/24 |
| 2013/0124913 A1* | 5/2013 | Tamura et al. ........... 714/4.11 |

OTHER PUBLICATIONS

Umesh Deshpande, Xiaoshuang Wang, and Kartik Gopalan. 2011. Live gang migration of virtual machines. In Proceedings of the 20th international symposium on High performance distributed computing (HPDC '11). ACM, New York, NY, USA, 135-146.*

International Search Report and Written Opinion dated Jul. 23, 2012 for corresponding International Application No. PCT/FR2012/051425, filed Jun. 21, 2012.

* cited by examiner

METHOD FOR DETECTING ATTACKS AND FOR PROTECTION

CROSS-REFERENCE TO RELATED APPLICATIONS

This Application is a Section 371 National Stage Application of International Application No. PCT/FR2012/051425, filed Jun. 21, 2012, which is incorporated by reference in its entirety and published as WO 2012/175886 on Dec. 27, 2012, not in English.

FIELD OF THE DISCLOSURE

The invention relates to a method of attack detection and protection in a virtualized IT environment.

It finds a particularly beneficial application in the securing of computing systems whose architecture is based on dematerialized computing resources, made available to a large number of users who access same remotely and in a manner which changes over time. Such an architecture is better known by the name cloud computing.

BACKGROUND OF THE DISCLOSURE

The concept of cloud computing has appeared recently to denote computing architectures in which computing processes traditionally located on user client stations of a company, or on servers of the company, are offloaded to remote servers. Remote hardware resources, distributed across the world, are thus accessed on demand via the Internet to create services accessible on-line by users. The applications and the data are no longer situated on the user's local computer, or on the server situated in this user's company, but in a cloud composed of a certain number of interconnected remote servers. With cloud computing, a company therefore no longer needs to set up its physical network infrastructure by itself. On the contrary, it can call upon a service provider that offers turnkey capabilities such as these. This same provider can thus offer a plurality of dematerialized infrastructures to a plurality of different clients on the basis of a same physical architecture of interconnected servers.

A cloud computing architecture generally relies on a dematerialization based on a virtualization of resources. Virtualization consists in running several operating systems on a single computer, as if they ran on separate computers. Virtualization makes it possible to increase the performance of an infrastructure by maximally optimizing the use of the resources of the infrastructure. Furthermore, it generates substantial savings by pooling resources and activities.

Cloud computing architectures are proposed to clients with service and availability guarantees negotiated by contract and subject to a pricing system adapted to the resources allocated (the term commonly used is "provisioning".) In order to guarantee this availability to clients at all times, systems make it possible to balance the resources in real time over a set of host servers. Thus, in the event of a load increase in a virtual machine hosted by a host server, which reaches its capacity limit when this load increase occurs, the system evaluates the priority of this virtual machine with respect to other co-tenant virtual machines hosted by the same host server in order to allocate additional resources to it. This allocation of additional resources consists in moving the virtual machine in question toward another host server which possesses sufficient resources, or in moving virtual machines that are co-tenants of this virtual machine so that it possesses more resources, or again in duplicating the virtual machine over several host servers so as to meet the increased resource requirements. To move a virtual machine in this way, use is made of a system of hot migration of virtual machines from a source host server toward a target host server. This system is known by the name of dynamic load balancing. Dynamic load balancing functionality thus makes it possible to automatically manage intermittent requests for additional resources within a cloud architecture in order to ensure that the virtual machine is continuously available. When a virtual machine is migrated toward another host server, it retains the same identifying characteristics, namely the same IP address, the same MAC address, etc. When this functionality is active and an upward variation in the consumption of resources (e.g. the processor, memory, or storage) is observed on a virtual machine in a cluster, and this variation causes the host server to reach its capacity limit, then one or more migrations of virtual machines toward one or more host servers can be effected so as to balance the load distribution between the host servers as well as possible. Thus, the virtual machine in question may be migrated, or virtual machines that are co-tenants of the virtual machine in question may be migrated. However, an upward variation of resource consumption or an attack caused for malicious purposes cannot be stopped by the migration of virtual machines. The resources required for the affected virtual machine continue to increase. More migrations of the virtual machine or machines can then occur and once the possibilities are exhausted, there is a risk that the last server will be unavailable, leading to interruption of access to other virtual machines present on the host server, and perhaps dedicated to other clients. Whatever the situation, all the servers through which a virtual machine has passed during successive migrations will have been affected.

Generally, a migration of a virtual machine is not harmless. It has effects on the network. In fact, all information relating to the state of the machine in the process of migrating transits through the network. When several virtual machines are migrated, it is obvious that these effects may penalize the performance of the network as a whole. On the other hand, migration is restrictive: the target host server must have access to the same sub-network as the source server, be based on the same type of CPU (Central Processing Unit), have access to the same storage medium, etc. These restrictions reduce the possibilities of migrations that risk always affecting the same host servers, and in the same way, the co-tenant virtual machines. Moreover, once the possibilities of migration have been exhausted, there is a risk that the last host server affected or the co-tenant machines will be unavailable.

Thus, an attack against a virtual machine in a cloud computing architecture where the dynamic load balancing functionality is active may have a dangerous effect on the host server, the co-tenant virtual machines, or even the whole architecture, by causing uncontrolled migrations. This is penalizing in an architecture intended to offer turnkey network services, the availability of which is guaranteed by contract, to a plurality of clients.

SUMMARY

The invention solves this problem by proposing a method of attack detection and protection of a set of virtual machines in a system comprising at least one first host server hosting said set of virtual machines, characterized in that it comprises the steps of:

receiving an attack detection message regarding a virtual machine, triggering a first migration of the virtual machine from the first host server toward a security system, receiving an attack treatment message regarding the migrated virtual machine.

With the method according to the invention, a virtual machine under attack is migrated toward an environment dedicated to security, adapted for treating the attack. Without this migration toward an environment dedicated to security, a virtual machine under attack would risk being subject to several successive migrations, or causing successive migrations of co-tenant virtual machines, without the attack being treated at the end of it all, which would penalize the whole architecture in terms of performance, and thus penalize all the clients. Indeed, the resource requirements of a virtual machine under attack tend to increase. If the attack is not treated, there is a risk that new migrations will ultimately be caused, either of the virtual machine under attack, or of co-tenant virtual machines of the machine under attack, or that the host server and the co-tenant virtual machines will be made unavailable. The method of the invention palliates the risks of uncontrolled successive migrations since in the event of an attack, the migrated machine is treated in an environment dedicated to security. Once treated, the virtual machine has requirements that are a priori fewer than when it was under attack; it therefore does not a priori require another migration. This advantage is important since migrations are restrictive and these restrictions limit the migration possibilities. The target host server must indeed have access to the same sub-network as the source host server, be based on the same type of processor, etc.

Moreover, a virtual machine migration has effects on the performance of the network since all the information relating to the virtual machine to be migrated transits through the network. The effect on the network performance increases exponentially with the number of virtual machines to be migrated. By limiting successive migrations, the effects on the network performance are limited. The performance of a cloud architecture is strategic, in the sense that all the clients of the architecture are concerned. Such performance has been subject to contracts and pricing negotiated with clients. It is therefore understandable that an attack targeting a virtual machine cannot be allowed to affect the entire performance of the architecture, and therefore all the clients.

Thus, the method according to the invention avoids overcharging the clients since the treatment of attacks avoids overconsumption of the resources of the cloud.

Moreover, with the method of the invention, treatment of an attack by a local security machine LSVA, hosted by the host server that hosts the virtual machine under attack, is therefore no longer limited by the capacity of the host server. In fact, the local security machine LSVA uses generic resources of the host server to treat an attack, which can rapidly lead to performance problems on the host server. These performance problems will affect not only the virtual machine under attack, but also the co-tenant virtual machines of the machine under attack. With the method of the invention, the virtual machine under attack is migrated toward the security system that comprises resources or physical hardware dedicated to security. The attack is treated in this dedicated environment, which shields the host server and the virtual machines it hosts from any harmful effect related to the attack.

A known security model recommends migrating all the network traffic bound for a target machine under attack hosted by a host server toward a physical device dedicated to security. With this model, once the traffic has been analyzed and filtered, the host server handles the return of healthy traffic and transmits it to the target machine. However, such a model has the drawback of doubling the network traffic: the traffic, bound for the target virtual machine, is transmitted to the security device by the host server before reaching the target virtual machine, and the host server recovers the traffic re-transmitted by the security device to transmit it to the target virtual machine. The method of the invention does not have this drawback since in the event of an attack, it is the virtual machine that is migrated, leading to the migration of its traffic which therefore does not need to be duplicated. The performance gains for the cloud architecture are considerable.

Furthermore, with the method of the invention it is possible to avoid the duplication of the virtual machine on several host servers that is possible with the conventional hot migration functionality. In this way propagation of the attack over several host servers is avoided.

Advantageously, the method comprises a step of triggering a second migration of the virtual machine toward the first host server when the security system has treated the attack.

With the method of the invention, the virtual machine that is under attack is isolated in a dedicated security environment for the duration of the attack. Once the attack has been treated, and therefore the risks of negative effects on the architecture have been removed, the virtual machine is migrated into its original cluster. It is the security machine that informs the supervisor of the end of the attack.

In an exemplary embodiment, when the system comprises a group of host servers, the migration is effected toward a second host server of the group.

When the attack that was targeting the virtual machine has been treated by the specialized security server, the migration of the virtual machine toward the original cluster is achieved toward a host server which is the most adapted for receiving the virtual machine. Thus, the host server may be different from the initial host server that the virtual machine left when it was under attack.

In an exemplary embodiment, the attack detection message originates from a local security virtual machine, co-tenant of the virtual machine on the host server, said message being transmitted following the detection by the local security virtual machine of an attack against the virtual machine.

The local security virtual machine LSVA, co-tenant of the virtual machine, is hosted by a generic host server. The local security machine makes it possible to detect a recognized and identified attack, or abnormal behavior of the virtual machine. Although limited in the execution of security functions over the whole of the traffic, because of the generic resources to which it has access, it makes it possible to transmit a first alarm relating to the behavior of the virtual machine. This first alarm contributes to the triggering of the migration toward a dedicated security server. Furthermore, in certain cases, the local security virtual machine LSVA can treat the attack, thereby avoiding a migration toward the dedicated security server.

In an exemplary embodiment, the method according to the invention comprises a step of detecting that the virtual machine has been subject to a number of migrations from a first host server toward a second host server greater than a threshold value during a set time period.

In another embodiment, the method according to the invention comprises a step of detecting that the virtual machine is at the origin of a number of migrations of co-tenant machines of said virtual machine greater than a threshold value during a set time period.

Advantageously, in these two examples, the first migration is triggered by correlating the detection message with the number of migrations during the set time period.

With the method of the invention, the decision to migrate a virtual machine from a source host server toward the security system OSS relies on information received from the local security machine LSVA that is correlated to information relating to the life of the virtual machine and relating to the migration history of the virtual machine. Thus, if a virtual machine has been subject to a number of migrations greater than a value deemed to be normal during a given time period, it is considered as being subject to an attack and is migrated toward the dedicated security server.

Advantageously, the attack is treated by a security virtual machine hosted by said security system, said security machine being specialized in the treatment of said attack.

The method of the invention makes it possible to use the most appropriate security tool for the attack that is impacting the migrated virtual machine, and this, in an environment adapted for the treatment of security functions. The security tool may be a specialized security tool such as for example a WAF (Web Application Firewall), or a generic security tool, such as for example an IDS (Intrusion Detection System). The chances of stopping or attenuating the attack are therefore increased by comparison with the treatment of this attack in a more conventional environment, i.e. one not dedicated to security.

The invention also relates to a module for migrating a virtual machine of a set of virtual machines hosted by a first host server, from said first host server toward a security server of a security system, characterized in that it comprises:

means for triggering a migration, arranged for triggering a migration of the virtual machine from the first host server toward the security server, reception means, arranged for receiving an attack detection message regarding the virtual machine, and for receiving an attack treatment message regarding the migrated virtual machine.

The invention also pertains to a supervisor entity of a network, said network comprising a first system of at least one first host server hosting a set of virtual machines and a security system, termed second system, comprising at least one security server, said entity comprising:

supervision means arranged to supervise said first and second systems, said entity being characterized in that it comprises a migration module according to the invention.

The invention also relates to an attack detection and protection system, comprising:

a supervisor entity according to the invention, an optimized security system comprising at least one security server hosting a set of virtual security machines.

The invention also pertains to a program on a data medium that can be loaded into a computer memory, the program comprising portions of code for executing the steps of the method according to the invention, when the program is executed on said computer.

The invention also relates to a data medium on which the computer program according to the invention is recorded.

BRIEF DESCRIPTION OF THE DRAWINGS

Other features and advantages of the present invention will be better understood from the description and from the appended drawings among which.

An architecture capable of implementing a method of attack detection and protection according to the invention will now be described with reference to FIG. 1.

DETAILED DESCRIPTION OF ILLUSTRATIVE EMBODIMENTS

A cloud computing network infrastructure 10 comprises at least one set 11 of resources organized into a cluster. The cluster 11 groups a set of host servers 11-1, 11-2, . . . etc. Each host server 11-1, 11-2 of the cluster 11 is adapted for hosting one or more virtual machines VM11, VM12, VM21, . . . etc. More precisely, cluster 11 groups host servers capable of hosting virtual machines pertaining to a same functional area. Each host server 11-1, 11-2 of the cluster 11 also hosts a particular virtual machine, called a local security virtual machine (or LSVA Local Security Virtual Appliance) 12-1, 12-2. A local security virtual appliance or LSVA, for example the local security machine 12-1 is adapted for detecting attacks against virtual machines hosted by the host server 11-1, or abnormal behavior of these machines. With this aim, the local security machine 12-1 uses part of the resources of the host server 11-1, in the same way as the other active virtual machines hosted by this server. The local security machine 12-1 is adapted for supervising the consumption of resources and the traffic bound for the virtual machines hosted by the host server 11-1, for analyzing the fields of the IP datagrams circulating at the level of the host server 11-1, for deducing information on attacks against virtual machines hosted by the host server 11-1, and for detecting abnormal consumption of resources by virtual machines. For example, the local security machine 12-1 is capable of detecting abnormal behavior in an active virtual machine of the host server 11-1, such as a sudden load increase, and deciding to carry out an advanced analysis of the virtual machine. The local security machine 12-1 is adapted for implementing countermeasures when it has detected an attack on a virtual machine of the host server 11-1. It is however limited in the execution of security functions by the host server resources that are available to it. The local security machine 12-1 is also adapted for transmitting information relating to the attack detected against a virtual machine of the host server 11-1, or relating to the abnormal behavior of this machine, to a supervisor entity 13 of the architecture, more precisely a migration module 13-1. This transmission of information is triggered, for example, when the local security machine 12-1 detects a value of traffic toward a virtual machine greater than a predefined value. In a second exemplary embodiment, the local security machine 12-1 detects a known attack signature in the traffic bound for a virtual machine. In a third exemplary embodiment, the local security machine 12-1 detects a consumption of resources greater than a set value. In another exemplary embodiment, the local security machine 12-1 detects behavior that deviates from so-called normal behavioral profiles that it has previously stored in memory.

The network infrastructure 10 according to the invention also comprises an OSS (Optimized Security System) 14. The security system 14 is a particular cluster composed of specialized security servers 14-1, 14-2, etc. dedicated to security. A specialized security server 14-1, 14-2, comprises special hardware dedicated to security activities. For example, the server 14-1 comprises a specific network card allowing it to process a load ten to thirty times larger than that processed by generic hardware. The specialized security server 14-1 is adapted for hosting optimized security virtual machines or OSVAs (Optimized Security Virtual Appliances), OSVA1 and OSVA2 in FIG. 1, which use the specific hardware of the specialized security server 14-1 that hosts them for activities exclusively dedicated to security. An optimized security virtual machine OSVA1, OSVA2 is of generic or specialized type. More precisely, an optimized security virtual machine is dedicated to one type of attack. For example an optimized security virtual machine is a WAF (Web Application Firewall) tool that specifically processes http requests and that is therefore adapted for treating attacks aimed at web servers. Another example of a specialized security machine is a machine adapted for performing packet inspections, analyzing the content of IP frames, beyond the header, in order to detect intrusions, or filter certain packets (the term then used is DPI or Deep Packet Inspection). A generic virtual security machine is for example a Network Based Intrusion Detection System (NIDS) or an Intrusion Prevention System (IPS), both based on the detection of attacks by recognition of attack signatures in traffic. Thus, the specialized security server 14-1 may host a plurality of optimized security virtual machines, some being generic and others being dedicated to treating certain types of attack. The specialized security server 14-1 of the optimized security system 14 is also adapted for temporarily hosting a virtual machine under attack, initially hosted by a host server, for example the host server 11-1, and for treating the attack. More precisely, the virtual machine under attack, for example the virtual machine VM11, which is migrated onto the specialized security server 14-1 by the migration module 13-1, is associated with an optimized security virtual machine capable of treating the attack, for example the security virtual machine OSVA1. A migrated virtual machine is said to be associated with an optimized security virtual machine when the optimized security virtual machine is busy with the virtual machine. The security virtual machine OSVA1 is also adapted for informing the supervisor entity 13 that the attack targeting virtual machine VM11 has been treated. Although the security server 14 temporarily hosts virtual machines that are active for clients, it is hidden from the clients. In fact, no virtual machine can be deployed by a client on this server. Thus, risks of introducing security flaws into the security system 14 are limited. Furthermore, the security functions implemented by the security virtual machines OSVA cannot be reached by dishonest clients that might be in search of flaws.

The architecture 10 also comprises the supervisor entity 13, materialized for example by a server. The supervisor is described in detail with reference to FIG. 3. The supervisor 13 is arranged to provide overall supervision of the cloud architecture 10. Thus, the supervisor 13 is adapted for supervising all the clusters and the optimized security system OSS, for controlling the creation, activation and liberation of virtual machines on a host server of a cluster, for consulting the load of each of the servers of the cluster 11, as well as that of the hosted virtual machines, etc. The supervisor 13 is also adapted for triggering, according to the invention, a migration of a virtual machine suspected of being under attack, from a host server toward the optimized security system 14. With this aim the supervisor 13 comprises a migration module 13-1 which implements a Dynamic Load Balancing (DLB) functionality. The suspicion of attack follows the receipt of a message from a local security machine LSVA hosted by a host server and informing the migration module 13-1 of the detection of an attack against a virtual machine, or abnormal behavior of this machine. In an exemplary embodiment, the information received from the local security machine LSVA can be correlated by the migration module 13-1 with information that it holds, for example a history of migrations relating to the virtual machine, or a history of co-tenant machine migrations that the virtual machine has caused. For example, if the virtual machine has been migrated a number of times greater than a set value during a given time period, then this allows the migration module 13-1 to trigger the migration. In another exemplary embodiment, if the virtual machine is at the origin of a number of migrations of co-tenant machines greater than a given threshold value during a given time period, then the migration module 13-1 triggers the migration. The migration module 13-1 is also adapted for positioning a virtual machine whose migration it has triggered from the host server 11-1, for example VM11, toward the security server 14-1 with an optimized security virtual machine, for example OSVA1, in such a way that the latter treats the attack aimed at the virtual machine VM11 and thus busies itself with the virtual machine VM11, where treatment of the attack is concerned. The migration module 13-1 is adapted for receiving from the optimized security virtual machine OSVA1 a message informing it that the attack of the virtual machine VM11 has been treated. The migration module 13-1 is also adapted for operating a migration of the virtual machine VM11 thus treated toward the original cluster 10. This migration corresponds to a return to normal operation for the virtual machine VM11. During such a migration, the supervisor 13 is adapted for choosing the host server of the cluster 11 that is the best adapted, in capacity terms, for hosting the virtual machine VM11 thus healed.

Figure 1:
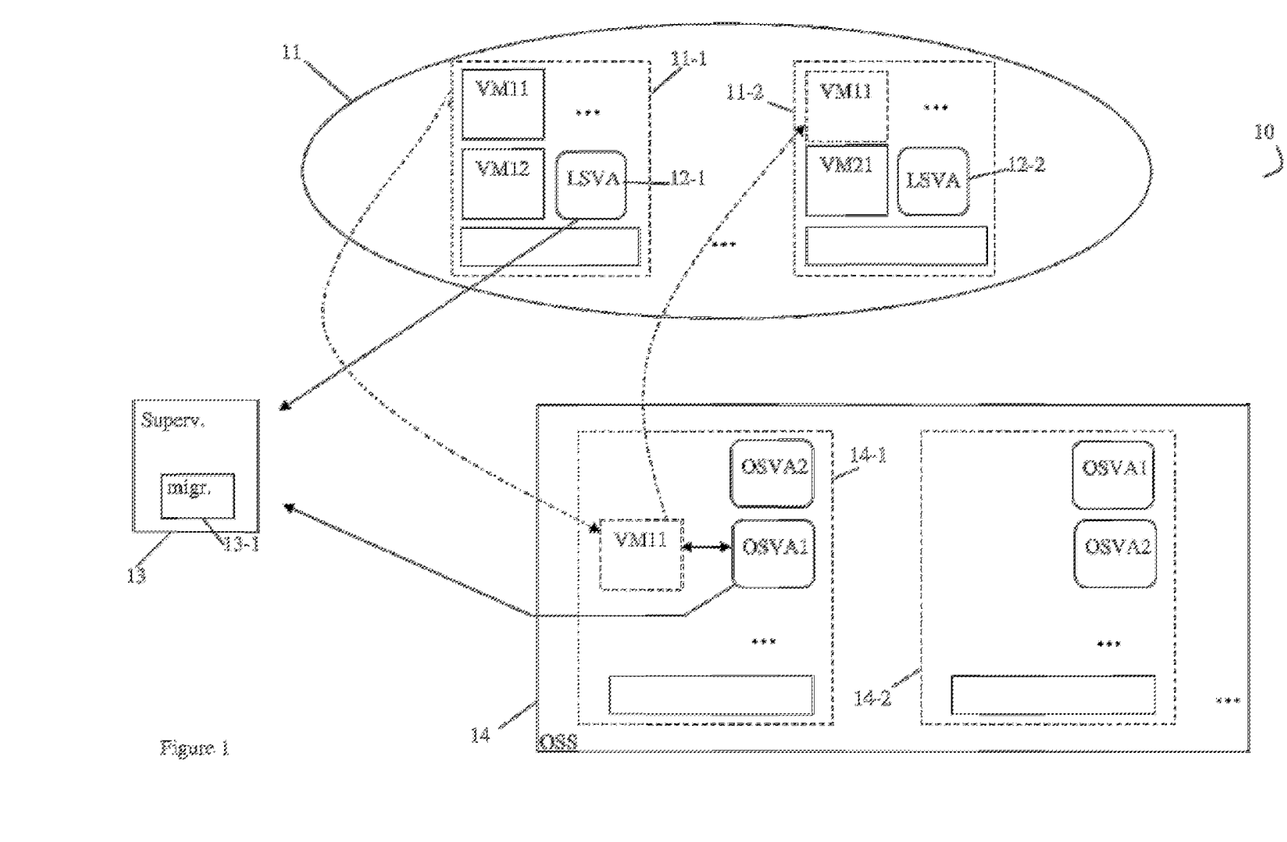
FIG. 1 shows a network architecture adapted for implementing a method of attack detection and protection described with reference to FIG. 2.

A single cluster 11 is shown in FIG. 1, the architecture 10 may of course contain a plurality of clusters, each being dedicated to a particular functional area. In the same way, the optimized security system 14 is not limited in the number of security servers, or in numbers of security virtual machines hosted by the security servers.

Figure 2:
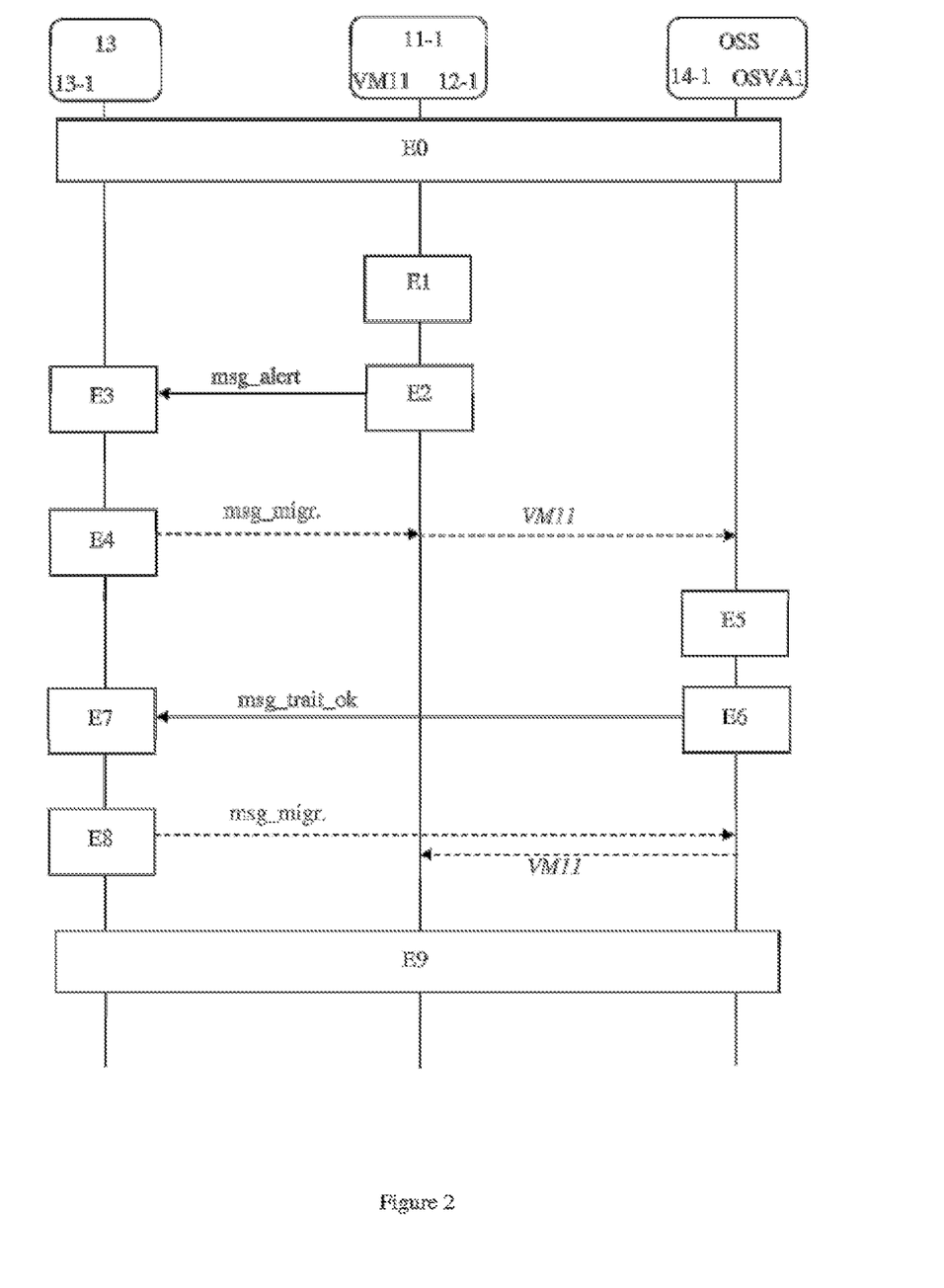
FIG. 2 shows the steps of the method of attack detection and protection according to a first exemplary embodiment.

A method of attack detection and protection will now be described with reference to FIG. 2.

In an initial state E0 of normal operation, the virtual machine VM11, hosted by the host server 11-1, has been created by the supervisor 13, and it is active.

In a detection step E1, the local security machine 12-1 detects an attack against the virtual machine VM11. For example, the local security machine 12-1 detects an unusual load increase of the traffic bound for the virtual machine VM11, and/or certain types of frames, and/or certain attack signatures in the IP frames. This detection is operated by the local security machine 12-1, for example at the level of the operating system of the host server 11-1 hosting the virtual machine VM11. The local security machine 12-1, as a virtual machine hosted by the host server 11-1, shares the resources of the host server 11-1 with other virtual machines, in this case the virtual machines VM11 and VM12. In the exemplary embodiment described here, it is supposed that the local security machine 12-1 performs a summary analysis of the attack but is not adapted for treating the attack alone. For example, the local security machine 12-1 does not possess enough resources, in capacity terms, to treat the attack aimed at the virtual machine VM11. In another exemplary embodiment, it does not possess security functions adapted for treating the attack.

In a following alarm step E2, the local security machine 12-1 sends to the migration module 13-1 of the supervisor 13 an alarm message informing it that the virtual machine VM11 is under attack and that the local security machine 12-1 is not adapted for treating this attack on its own.

In a step E3 of receiving the alarm message, the migration module 13-1 receives the alarm message sent during the preceding step. The alarm message identifies the virtual machine VM11, by providing its network characteristics, in this case its IP address, its MAC address, etc. The alarm message also comprises information relating to the attack in progress or to the abnormal behavior detected. As non-limiting examples, the information can include an attack signature, an attack type, a main characteristic of the attack, for example "http attack" etc.

In a following migration step E4, the migration module 13-1 triggers a migration of the virtual machine VM11 from the host server 11-1 toward the optimized security system OSS. With this aim, the migration module 13-1 triggers the hot migration functionality. This triggering causes the movement of the virtual machine VM11 from the host server 11-1 toward the optimized security system OSS, more precisely, toward a specialized security server, for example the security server 14-1. Upon this migration, the virtual machine VM11 is associated, on the specialized security server 14-1, with an optimized security virtual machine, for example OSVA1. The information transmitted by the local security machine 12-1 to the migration module 13-1 during the alarm step E2 has made it possible to choose a particular optimized security virtual machine, here OSVA1. Thus, in the event of the information transmitted by the local security machine 12-1 during the alarm step E2 indicating that the attack is specific, for example that it is an http attack, then the migration module 13-1 associates the virtual machine VM11 with a security virtual machine of WAF type. If on the other hand, it is a network attack, the migration module 13-1 associates the virtual machine VM11 with a generic security machine, for example an IDS or an IPS. It is supposed here that the attack is an http attack and that the optimized security virtual machine OSVA1 is specialized and of WAF type. It should be recalled here that the security virtual machine OSVA1 uses resources of the specialized security server 14-1, and therefore enjoys much larger processing capabilities than a generic host server, such as the host server 11-1.

In an analysis and protection step E5, the optimized security virtual machine OSVA1 treats the attack aimed at the virtual machine VM11 with which it is associated. It should be recalled here that by migrating, the virtual machine VM11 has kept the network characteristics that it possessed on the host server 11-1. Thus, the virtual machine VM11 still keeps its IP address and its MAC address and still receives the traffic it received initially. It is therefore still under attack when it migrates onto the security server 14-1 and this attack is then taken in charge by the optimized security machine OSVA1. For example, in the case of an http attack, the optimized security virtual machine OSVA1 of WAF type applies a set of rules in order to recognize the attacks, to reject the attack traffic and to let through the legitimate traffic. At the end of the analysis and protection step E5, the virtual machine VM11 is considered to be protected, in the sense that the attack that targeted it is considered to have been treated by the optimized security machine OSVA1.

In a step E6 of sending information regarding the end of the attack, the optimized security virtual machine OSVA1 sends to the migration module 13-1 an information message signaling that the attack targeting the virtual machine VM11 has been treated.

In a step E7 of receiving information, the supervisor 13 receives the message sent during the preceding step.

In a step E8 of migration toward the cluster, following the treatment of the attack targeting the virtual machine VM11 by the security machine OSVA1, the migration module 13-1 triggers a migration of the virtual machine VM11 toward the cluster 11. With this aim, the supervisor 13 that supervises all the resources of the architecture and notably of the cluster 11 selects a host server from the cluster 11 adapted for hosting the virtual machine VM11. This selection consists in identifying a host server that possesses sufficient capacity to host the virtual machine VM11. This host server may be another server than that which was hosting the virtual machine initially.

In a final step E9, the virtual machine VM11 has been migrated toward the host server 11-2 and it is active.

The method has been described for a virtual machine under attack. Of course, several virtual machines may be simultaneously under attack and several migrations may be operated simultaneously.

Figure 3:
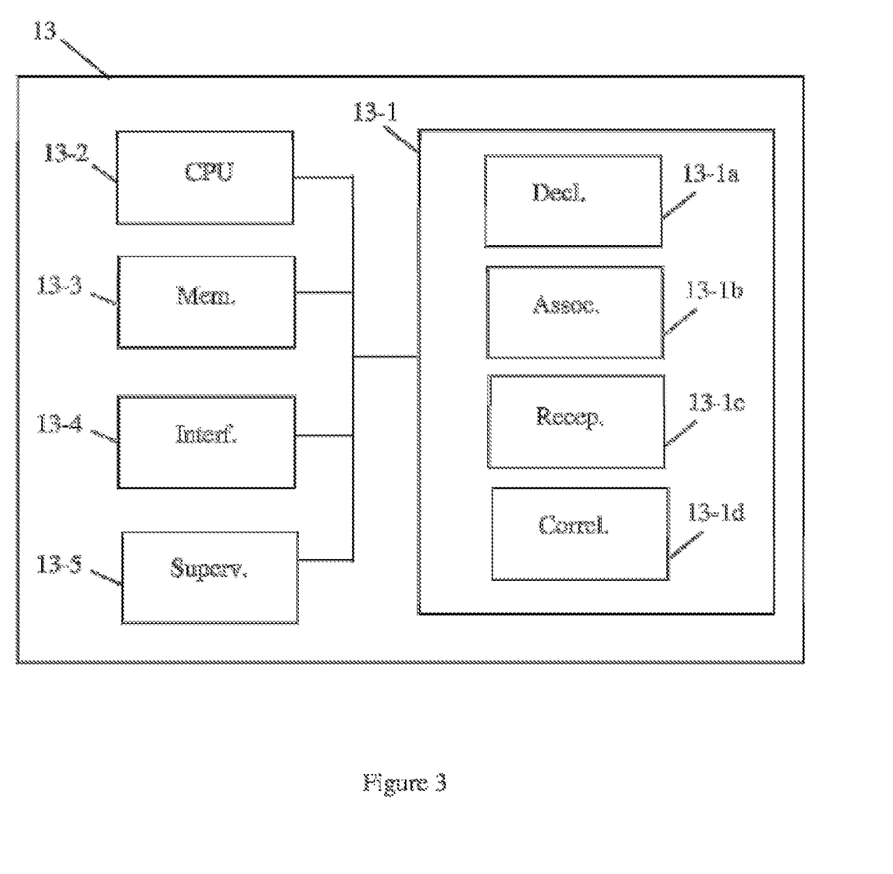
FIG. 3 is a diagram of a module of migration of virtual machines, according to a first exemplary embodiment of the invention.

A supervisor 13 according to the invention will now be described with reference to FIG. 3.

The supervisor 13 is an IT server which conventionally comprises:

a microprocessor 13-2, or CPU (Central Processing Unit), intended to load instructions into memory, to execute them, and to carry out operations;

a set of memories, including a volatile memory 13-3, or RAM (Random Access Memory) used to execute code instructions, store variables, etc.;

communication interfaces 13-4, adapted for communicating with the host servers, the virtual machines, the optimized security system, etc., that constitute the cloud architecture 10;

a supervision module 13-5 adapted for supervising the whole cloud architecture 10. In particular, the supervision module 13-5 knows at any time the load of each of the active virtual machines hosted by the host servers of the architecture;

a migration module 13-1 according to the invention, adapted for handling the migrations of a virtual machine from a host server of the cluster 11 toward the optimized security system OSS on the one hand, and on the other hand the migrations from the optimized security system OSS toward a cluster. The migration module 13-1 implements the hot migration functionality and it comprises:

triggering means 13-1a, arranged to trigger a migration of a virtual machine from a host server of the cluster 11 toward the optimized security system OSS, or from the optimized security system toward a host server of the cluster. With this aim, the triggering means 13-1a use the information received from a local security machine LSVA co-tenant of the virtual machine on the host server, and the information received from the optimized security virtual machine OSVA. In an exemplary embodiment of the invention, the triggering means 13-1a use information obtained from correlation means 13-1d;

association means 13-1b, arranged to select an optimized security machine OSVA of the optimized security system OSS, adapted for treating an attack against a virtual machine to be migrated from a host server toward the security system. The association means 13-1b are adapted for choosing a specialized or generic security machine. This choice depends on the information received, prior to the migration, from the local security virtual machine LSVA co-tenant of the virtual machine that is subject to migration. This information relates to the behavior of the virtual machine and concerns, for example, a recognized and identified attack, or abnormal behavior that would require the local security machine to have resources to investigate that it does not possess on the host server;

receiving means 13-1c, arranged to receive from a local security virtual machine LSVA a message comprising information relating to a virtual machine hosted by a host server of the cluster 11. Thus, the receiving means 13-1c are adapted for receiving from a local security machine LSVA information on an attack in progress on the virtual machine, or on abnormal behavior of the virtual machine. They are also adapted for receiving from an optimized security virtual machine OSVA information on the end of an attack;

in an embodiment of the invention, the migration module 13-1 also comprises correlation means 13-1d, arranged to correlate additional information relating to the virtual machine with the information received from the local security machine LSVA. For example, this information relates to the history of the migrations undergone by the virtual machine in question. In another exemplary embodiment, this information relates to the number of migrations of which the virtual machine is the origin. These migrations can relate to co-tenant machines of the virtual machine.

In another exemplary embodiment, the migration module 13-1 is independent of the supervisor 13. The migration module 13-1 then comprises means for communicating (not shown) with the supervisor 13. In this embodiment one could envision having several migration modules for one cloud architecture, one migration module being able to be dedicated to each of the clusters. In the exemplary embodiment where it is incorporated into the supervisor 13, the receiving means 13-1c cooperate with the communication interfaces 13-4 of the supervisor 13.

The communication interfaces 13-4, the supervision module 13-5, the migration module 13-1 and its component means are preferably software modules comprising software instructions for executing the steps of the attack detection and protection method described previously.

The invention therefore also relates to:

a computer program containing instructions for the implementation of the method of attack detection and protection such as described previously, when this program is executed by a processor of the supervisor device;

a readable recording medium on which the computer program described above is recorded.

The software modules may be stored in, or transmitted by a data medium. The latter can be a hardware storage medium, for example a CD-ROM, a magnetic diskette or a hard disk, or else a transmission medium such as a telecommunications network or a signal.

The invention also relates to an attack detection and protection system comprising a supervisor device 13 and an optimized security system OSS comprising at least one optimized security server, adapted for implementing an operation of migration of a virtual machine, for treating the attack, and for migrating the virtual machine, once treated, toward its cluster of origin.

Although the present disclosure has been described with reference to one or more examples, workers skilled in the art will recognize that changes may be made in form and detail without departing from the scope of the disclosure and/or the appended claims.

The invention claimed is:

1. A method of attack detection and protection of a set of virtual machines in a system comprising at least one first host server hosting said set of virtual machines, wherein the method comprises:
   receiving, by a device, an attack detection message regarding a virtual machine, said attack detection message being received when the virtual machine has been subjected to a number of migrations from the first host server toward a second host server greater than a first threshold value during a first set time period or when the virtual machine is at an origin of a number of migrations of co-tenant machines of said virtual machine greater than a second threshold value during a second set time period,
   triggering, by the device, a first migration of the virtual machine from the first host server toward a security system, said security system comprising security virtual machines dedicated to treating attacks, including a security virtual machine associated to the migrated virtual machine to treat the attack,
   receiving, by the device, an attack treatment message signaling that the attack detected against the migrated virtual machine has been treated, and
   triggering a second migration of the virtual machine toward the first host server when the security system has treated the attack.

2. The method of attack detection and protection as claimed in claim 1, in which, the system comprises a group of host servers and the second migration is effected toward a second host server of the group.

3. The method of attack detection and protection as claimed in claim 1, in which the attack detection message originates from a local security virtual machine, co-tenant of the virtual machine on the host server, said message being transmitted following the detection by the local security virtual machine of an attack against the virtual machine.

4. The method of attack detection and protection as claimed in claim 1, in which the first migration is triggered by correlating, with the device, the detection message with the number of migrations during the set time period.

5. The method of attack detection and protection as claimed in claim 1, in which the attack is treated by a virtual security machine hosted by said security system, said security machine being specialized in the treatment of said attack.

6. The method of attack detection and protection as claimed in claim 1, in which the first migration is triggered by correlating, with the device, the detection message with the number of migrations during the set time period.

7. A supervisor entity of a network, said network comprising a first system of at least one first host server hosting a set of virtual machines and a security system, said security system comprising at least one security server, said entity comprising:
   a processing unit; and
   a non-transitory memory comprising code instructions stored thereon, which when executed by the processing unit configure the processing unit to:
   supervise said first system and said security system,
   migrate a virtual machine of the set of virtual machines hosted by the first host server, from said first host server toward the security server of the security system, which comprises:

receiving an attack detection message regarding the virtual machine, said attack detection message being received when the virtual machine has been subjected to a number of migrations from the first host server toward a second host server greater than a first threshold value during a first set time period or when the virtual machine is at an origin of a number of migrations of co-tenant machines of said virtual machine greater than a second threshold value during a second set time period, triggering a first migration of the virtual machine from the first host server toward the security server, and receiving an attack treatment message regarding the migrated virtual machine signaling that the attack detected against the migrated virtual machine has been treated; and trigger a second migration of the virtual machine toward the first host server when the security system has treated the attack.

8. An attack detection and protection system comprising:
at least one security server hosting a set of virtual security machines dedicated to treating attacks;
a supervisor entity of a network, said network comprising a first system of at least one first host server hosting a set of virtual machines and a security system, said security system comprising said at least one security server, said supervisor entity comprising a processing unit and a non-transitory memory comprising code instructions stored thereon, which when executed by the processing unit configure the processing unit to:
supervise said first system and said security system,
migrate a virtual machine of the set of virtual machines hosted by the first host server, from said first host server toward the at least one security server of the security system, a security virtual machine of the set of virtual security machines being associated to the migrated virtual machine to treat the attack, wherein migrating a virtual machine comprises:
receiving an attack detection message regarding the virtual machine, said attack detection message being received when the virtual machine has been subjected to a number of migrations from the first host server toward a second host server greater than a first threshold value during a first set time period or when the virtual machine is at an origin of a number of migrations of co-tenant machines of said virtual machine greater than a second threshold value during a second set time period, triggering a first migration of the virtual machine from the first host server toward the security server, and receiving an attack treatment message regarding the migrated virtual machine signaling that the attack detected against the migrated virtual machine has been treated; and trigger a second migration of the virtual machine toward the first host server when the security system has treated the attack.

9. A non-transitory hardware storage medium comprising a program stored thereon, the program comprising portions of code for executing steps of a method of attack detection and protection of a set of virtual machines in a system comprising at least one first host server hosting said set of virtual machines, when the program is executed on a computer, wherein the method comprises:

receiving, by the computer, an attack detection message regarding a virtual machine, said attack detection message being received when the virtual machine has been subjected to a number of migrations from the first host server toward a second host server greater than a first threshold value during a first set time period or when the virtual machine is at an origin of a number of migrations of co-tenant machines of said virtual machine greater than a second threshold value during a second set time period, triggering, by the computer, a first migration of the virtual machine from the first host server toward a security system, receiving, by the computer, an attack treatment message signaling that the attack detected against the migrated virtual machine has been treated, and triggering, by the computer, a second migration of the virtual machine toward the first host server when the security system has treated the attack.

* * * * *